United States Patent
Bonyak et al.

(10) Patent No.: US 12,502,117 B2
(45) Date of Patent: Dec. 23, 2025

(54) POWER LINE NOISE REDUCTION IN ELECTRICALLY COUPLED MEDICAL SYSTEMS

(71) Applicant: Biosense Webster (Israel) Ltd., Yokneam (IL)

(72) Inventors: Yevgeny Bonyak, Haifa (IL); Roman Inzelbuh, Nave Ziv (IL); Michael Levin, Haifa (IL); Elia Wasserman, Kiryat Motzkin (IL); Omer Ovadia Hury Dror, Nesher (IL); Pesach Susel, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 386 days.

(21) Appl. No.: 18/104,481

(22) Filed: Feb. 1, 2023

(65) Prior Publication Data
US 2023/0284957 A1  Sep. 14, 2023

Related U.S. Application Data

(60) Provisional application No. 63/317,651, filed on Mar. 8, 2022.

(51) Int. Cl.
  *A61B 5/301* (2021.01)
  *A61B 5/308* (2021.01)
  *A61B 5/367* (2021.01)
  *A61B 5/283* (2021.01)

(52) U.S. Cl.
  CPC .............. *A61B 5/301* (2021.01); *A61B 5/308* (2021.01); *A61B 5/367* (2021.01); *A61B 5/283* (2021.01)

(58) Field of Classification Search
  CPC ......... A61B 5/301; A61B 5/308; A61B 5/367; A61B 18/16; A61B 5/7203
  See application file for complete search history.

(56) References Cited

U.S. PATENT DOCUMENTS

| | | | |
|---|---|---|---|
| 3,880,146 A | 4/1975 | Everett et al. | |
| 4,094,320 A * | 6/1978 | Newton | G01R 31/52 606/35 |
| 4,437,464 A * | 3/1984 | Crow | H02H 9/02 128/908 |

(Continued)

FOREIGN PATENT DOCUMENTS

KR  2015057388 A  5/2015

OTHER PUBLICATIONS

Nick Davis, Safety Capacitors First: Class-X and Class-Y Capacitors, May 6, 2019, https://www.allaboutcircuits.com/technical-articles/safety-capacitor-class-x-and-class-y-capacitors/#:~:text=Y2%20safety%20capacitors%20are%20more,Y%20safety%20requirements%20and%20standards. (Year: 2019).*

(Continued)

*Primary Examiner* — Catherine M Voorhees

(57) ABSTRACT

An apparatus includes two or more medical systems and a low impedance path. The two or more medical systems have respective electrical outputs and respective separate isolation grounds each isolated from power lines and from earth ground, wherein the two or more medical systems are electrically coupled one with the other via the patient. The low impedance path connects the separate isolation grounds of the medical systems to one another, causing one or more leakage currents to flow via the low impedance path instead of via the patient.

9 Claims, 3 Drawing Sheets

(56) References Cited

U.S. PATENT DOCUMENTS

| | | | | |
|---|---|---|---|---|
| 4,754,757 | A | * | 7/1988 | Feucht .................. A61B 18/16 |
| | | | | 128/908 |
| 6,873,869 | B2 | | 3/2005 | Fischer |
| 7,454,757 | B2 | | 11/2008 | Bergs |
| 9,872,629 | B2 | | 1/2018 | Batzer et al. |
| 9,876,470 | B2 | | 1/2018 | Biel et al. |
| 2011/0137151 | A1 | * | 6/2011 | Lichtenstein ........ A61B 5/0538 |
| | | | | 600/424 |
| 2013/0324993 | A1 | * | 12/2013 | McCarthy ................ A61B 5/01 |
| | | | | 606/33 |
| 2014/0167518 | A1 | | 6/2014 | Risher-Kelly et al. |
| 2016/0183876 | A1 | * | 6/2016 | Shah ...................... A61B 5/318 |
| | | | | 600/509 |
| 2022/0095985 | A1 | * | 3/2022 | Bennett ................ A61B 5/349 |

OTHER PUBLICATIONS

European Search Report for corresponding EPA No. 23160315.0 dated Jul. 13, 2023.

Chen C-C, Chen C-W, Hsieh C-W. Noise-Resistant CECG Using Novel Capacitive Electrodes. Sensors. 2020; 20(9):2577. https://doi.org/10.3390/S20092577.

Ichikawa, et al., "Human-body Impedance and Electric Shock", Journal of Biomedical Systems & Emerging Technologies, vol. 5, No. 2, 02 pages, 2018.

* cited by examiner

POWER LINE NOISE REDUCTION IN ELECTRICALLY COUPLED MEDICAL SYSTEMS

CROSS REFERENCE TO RELATED APPLICATION

This application claims the benefit of U.S. Provisional Patent Application Ser. No. 63/317,651 entitled POWER LINE NOISE REDUCTION IN ELECTRICALLY COUPLED MEDICAL SYSTEMS that was filed on Mar. 8, 2022, the contents of which are incorporated by reference in its entirety.

FIELD OF THE DISCLOSURE

The present disclosure relates generally to reduction of electrical noise during acquisition of medical signals, and particularly to reduction of power line interference during acquisition of intra-cardiac electrocardiogram (IC-ECG) signals.

BACKGROUND OF THE DISCLOSURE

Various techniques for reducing electrical noise in medical systems were proposed in the patent literature. For example, U.S. Pat. No. 9,876,470 describes isolation for a medical amplifier provided by a low impedance path for noise across an isolation barrier. The low impedance path can include a capacitive coupling between a patient ground, which is isolated from control circuitry, and a functional ground of an isolation system that is isolated from earth ground. The low impedance path can draw noise current from an input of an amplifier of patient circuitry.

The present disclosure will be more fully understood from the following detailed description of the examples thereof, taken together with the drawings in which:

DETAILED DESCRIPTION OF EXAMPLES

Overview

Figure 1:
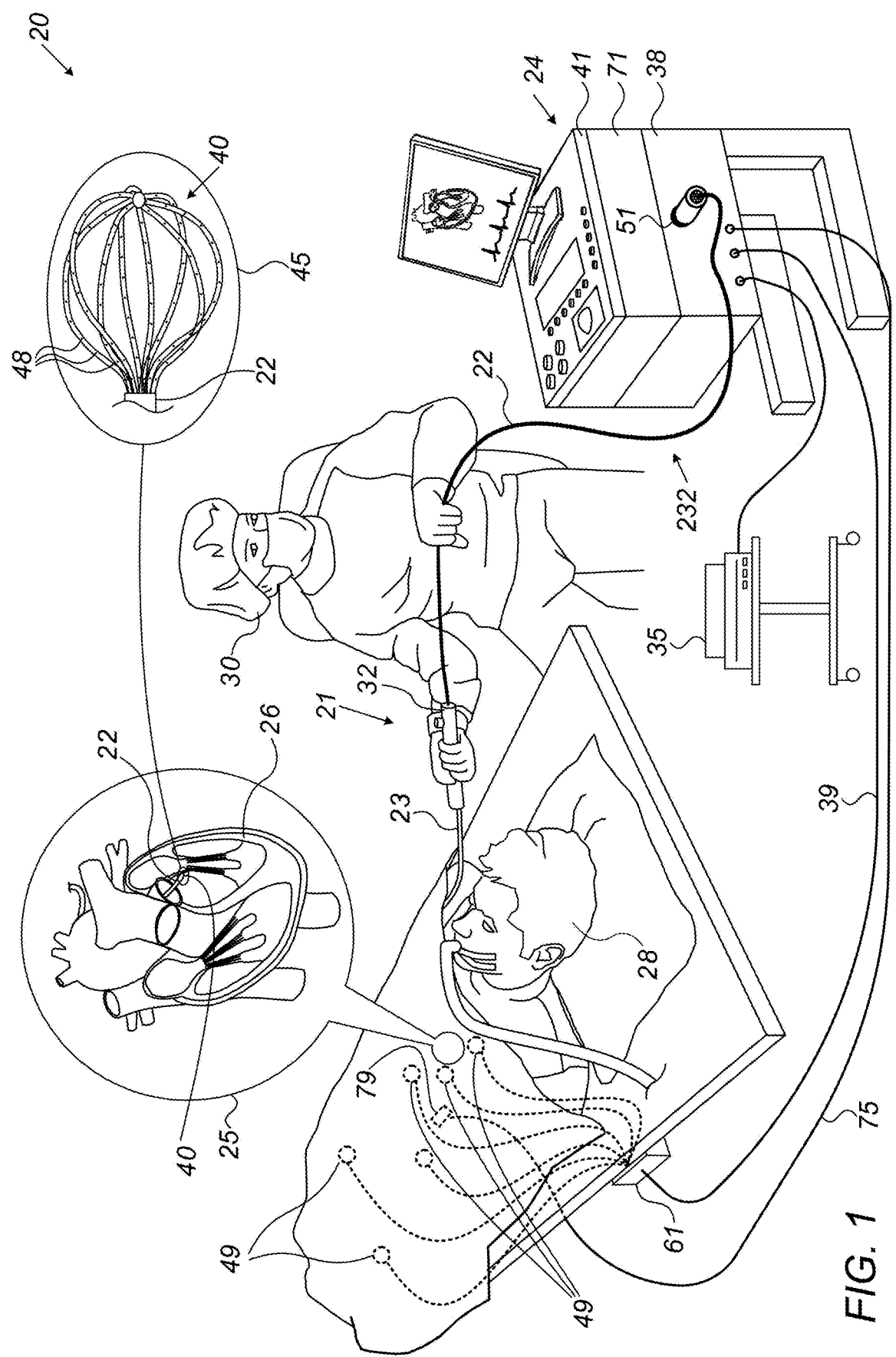
FIG. 1 is a schematic, pictorial illustration of a catheter-based electrophysiological (EP) sensing and ablation system, in accordance with an example of the present disclosure.

Medical systems for invasive cardiac diagnostics and treatment of cardiac arrhythmia may acquire electrophysiological (EP) data, such as intra-cardiac electrocardiograms (IC-ECG), to identify cardiac arrhythmogenic tissue. Upon detection of arrhythmogenic tissue, a physician using the system may ablate the tissue using electrical ablation, such as radiofrequency (RF) ablation.

To characterize cardiac tissue, an EP mapping system may measure unipolar IC-ECG signals acquired by electrodes of a catheter, relative to a Wilson Central Terminal (WCT) reference signal, which is formed from three body surface electrodes attached to the skin of a patient, as described below. The acquired IC-ECG signals may be distorted by power line noise (also referred to as Power Line interference—PLI).

One or more additional systems, such as those comprising an RF generator connected to the same or other electrodes of the catheter, and which close the circuit using an external indifferent electrode on the skin, can add more power line noise to the measurement. A typical source of this electrical noise is the difference in current leakages in different circuitries (e.g., transformers) through isolation barriers of the different systems (e.g., different leakage currents in EP sensing and ablation subsystems that use a same catheter, or even use different catheters that are located in a body of a patient at the same time). For example, when intra-body electrodes and body surface connections are not directly connected to the earth ground, this leakage imbalance retains a considerable amount of power line noise.

A leakage imbalance therefore creates a local potential on the catheter electrode that cannot be rejected by using, for example, the reference measurement (e.g., using a reading from a WCT reference signal).

Any additional system connected to an electrical medical tool in electrical contact with the body, such as an Electrical Heart Stimulator, may add sources of power line noise, and, in particular, electrical leakage imbalance.

Examples of the present disclosure that are described hereinafter provide apparatuses and methods to suppress power line noise that occurs when two or more medical systems are electrically coupled via media, such as a patient's body tissue.

In some examples, an additional low-impedance path is used to directly connect the system grounds to one another, so the leakage passes through this path and not though the body. As a result, the additional power line noise is not observed in, for example, EP measurements such as IC-ECGs, when multiple systems are connected (e.g., connection of an RF ablation generator).

Specifically, in case of an IC-ECG mapping system and an RF ablation generator, the low-impedance path connects a first patient circuit between an ablation electrode and an indifferent electrode, e.g., a return electrode in the form of patch, connected to an ablation signal generator (RF or IRE), to a second patient circuit between the IC-ECG electrode and WCT connected to an amplifying circuit.

In another example, multiple catheters are located inside the heart at a same time. In that case, one catheter can be used to perform ablation and another catheter used to sense signals. The catheters are electrically coupled via tissue and blood conductivity and the problem of leakage imbalance holds for multiple catheters, as well as the disclosed solutions being applicable.

Typically, a safety capacitor is inserted in the low-impedance path, which is required to protect the medical equipment by breaking the galvanic coupling between the systems. In addition to such a safety capacitor, an optional RF choke may be added to prevent RF leakage when an RF generator is involved.

Each patient applied part has its own potential of power line frequency because of difference in leakage current through the system's isolation. When one system patient applied part touches the electrodes of another system (RF generator), for example touches the part of IC electrodes, this causes the changes of their potential and the additional power line noise observed by the measurements of these electrodes relatively to the WCT.

The disclosed technique provides a simple and effective means to suppress power line noise and thereby improve the quality of EP diagnostics signals, such as ECGs.

System Description

FIG. 1 is a schematic, pictorial illustration of a catheter-based electrophysiological sensing and ablation system 20, in accordance with an example of the present disclosure. System 20 may be, for example, a CARTO® 3 system, produced by Biosense-Webster, Irvine, California. As seen, system 20 comprises a catheter 21, having a shaft 22 that is navigated by a physician 30 into a heart 26 of a patient 28. In the pictured example, physician 30 inserts shaft 22 through a sheath 23, while manipulating shaft 22 using a manipulator 32 near the proximal end of the catheter.

In the example described herein, catheter 21 may be used for any suitable diagnostic purpose, such as electrophysiological mapping of heart 26. An ECG recording instrument 35 may receive various types of ECG signals sensed by system 20 during the process. In addition, catheter 21 may be used for radiofrequency (RF) ablation and/or irreversible electroporation (IRE) of, for example, arrhythmogenic tissue of heart 26.

As shown in inset 25 in the shown example, a distal end of shaft 22 of catheter 21 is fitted with a multi-electrode basket catheter 40. Inset 45 shows an arrangement of multiple electrodes 48 of basket catheter 40, of which a subset may be used for ablation (e.g., using a distal portion of electrodes 48 to perform pulmonary vein isolation). Any other suitable catheter also can be used for the ablation. The proximal end of catheter 21 is connected (51) to a control console 24 in order to, for example, acquire IC-ECGs and apply ablative signals, e.g. RF signals via the same or different electrodes 48, using, for example, switching circuitry (not shown) inside console 24 to select electrodes for sensing and for ablation.

Console 24 comprises a processor 41, typically a general-purpose computer, with suitable front end and interface circuits 38 for receiving IC-ECG signals as well as non-ECG signals (such as position signals) from electrodes 48 of catheter 21 disposed inside or near the heart and/or for applying ablative signals to one or more electrodes 48 from an ablative signal generator 71. For these purposes, interface circuits 38 and/or generator 71 are connected to electrodes 48 via cable 232 running within shaft 22. Interface circuits 38 are further configured to body surface ECG signals using surface body electrodes 49. Typically, electrodes 49 are attached to the skin around the chest and legs of patient 28. Processor 41 receive signals from electrodes 48 and electrodes 49 via interface circuits 38.

Four of surface body electrodes 49 are named according to standard ECG protocols: RA (right arm), LA (left arm), RL (right leg), and LL (left leg). A Wilson Central Terminal (WCT) may be formed by three of the four named body surface electrodes 49, and a resulting ECG signal, VWCT, is received by interface circuits 38. Specifically, a WCT is obtained by averaging the three external active limb electrode voltages measured with respect to an indifferent electrode 79.

In the shown example, catheter 21 can apply RF ablation using electrodes 48 relative to indifferent electrode 79, which is attached, for example, to the back of patient 28, with the electrical leads of electrodes 48 and indifferent electrode 79 tethered to generator 71 using cable 232 and a cable 75, respectively.

Processor 41 is typically programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Extension of ECG Acquisition Capabilities of a Catheter-Based Cardiac System

Figure 2:
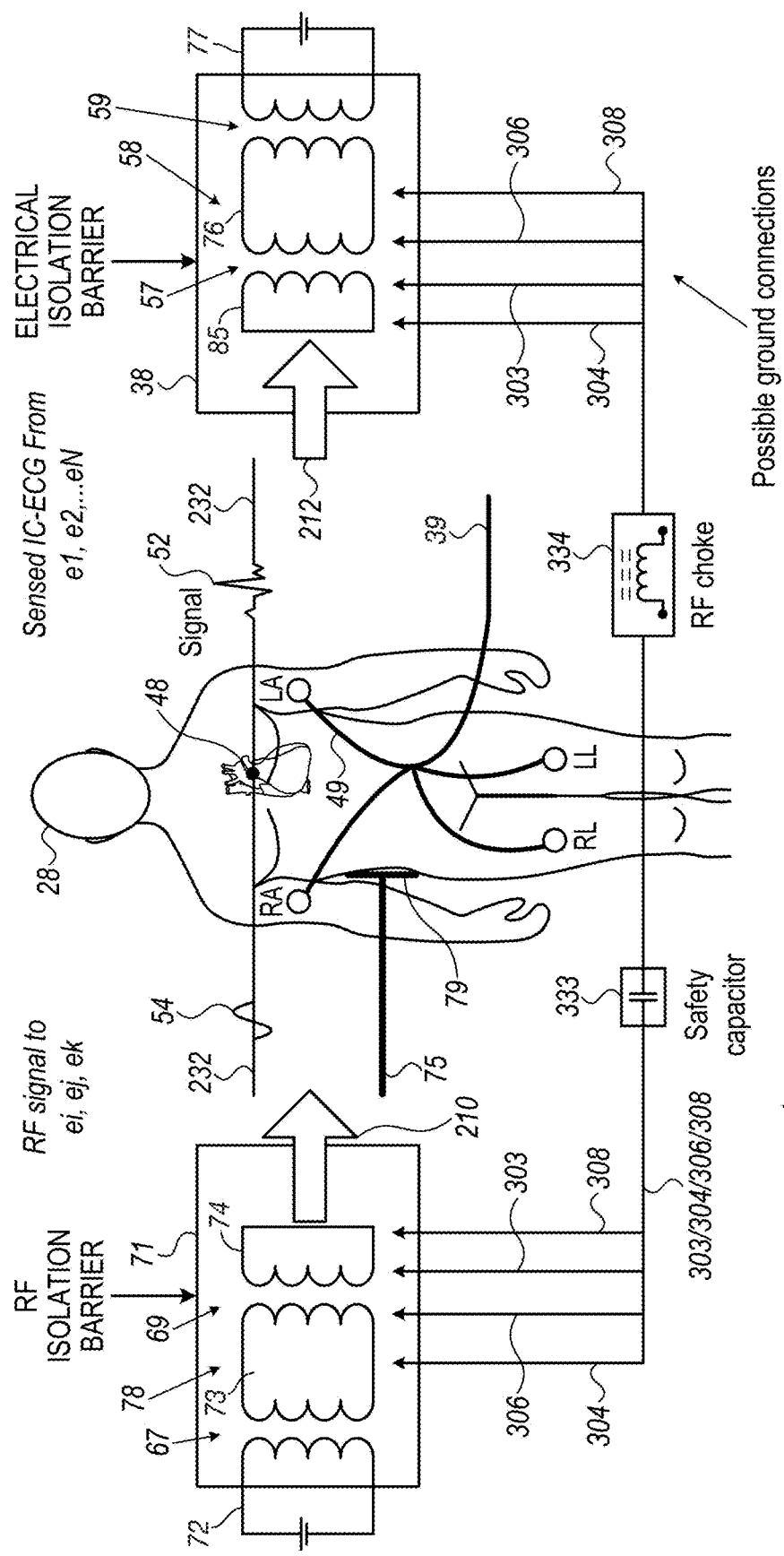
FIG. 2 is a pictorial illustration and an electrical diagram of the system of FIG. 1 to measure EP signals with a catheter by suppressing power line noise from the ablation subsystem of the system coupled to the same catheter, in accordance with an example of the present disclosure.

FIG. 2 a pictorial illustration and an electrical diagram of system 20 of FIG. 1 to measure EP signals with a catheter 21 by suppressing power line noise from different circuits, e.g., generator 71 and/or interface circuits 38 coupled to the same catheter 21, in accordance with an example of the present disclosure. Catheter 21 is proximally plugged (51) to interface circuits 38.

Interface circuits 38 receive electrical signals 52 from cable 232 connected to electrodes 48. Cable 232 may include a plurality of channels, e.g., one per electrode. Signals 52 are measured relatively to body surface reference (WCT) determined from cable 39. Body surface electrodes 49 are typically attached to the arms and legs of patient 28 as well as on the chest (not shown). Four of electrodes 49 are shown: RA (right arm), LA (left arm), RL (right leg), LL (left leg).

At the same time, generator 71, e.g. an RF generator, can output an RF waveform 54 via cable 232 as an ablation current between one or more electrodes 48 and an indifferent electrode 79 tethered with cable 75. Processor 41 may be involved in switching any of electrodes 48 (e1-eN of catheter 21) between EP-sensing and RF-ablative functions.

As the electrical diagram of FIG. 2 shows, the above setting amounts to two electrical potentials inside the body of the patient. A first potential schematically shown as an arrow 212 may be RF potential of generator 71 between electrodes 48 and indifferent electrode 79. A second potential, schematically shown as arrow 210, is a sensed IC-waveform potential on electrodes 48 relative to WCT and amplified by interface circuits 38. Electrodes 48 connected to generator 71 may include a first group of electrodes 48 on catheter 21 that is other than a second group of electrodes 48 on catheter 21 connected to EP sensing circuits 58 in interface circuits 38 for sensing IC waveform potential. Alternatively, or additionally, one or more of electrodes 48 may alternate between receiving ablative signals from generator 71 and sensing IC-waveform potential amplified by sensing circuits 58. In some example embodiments, a first catheter 21 with first electrodes 48 is connected to generator 71 and a second catheter 21 with second electrodes 48 is configured to sense IC-waveform potential.

According to some example embodiments, a low impedance path, e.g., 303, 304, 306 and/or 308 is used to directly connect one of the isolated grounds of generator 71 with one of the isolated grounds of sensing circuits 58, and the leakage passes through it and not though patient 28. According to some example embodiments, the low impedance path includes a Y2 safety capacitor 333. Optionally, the low impedance path may also include an RF choke 334.

Generator 71, having ablative circuits 78, is connected via cable 232 to one or more of electrodes 48, and via cable 75 to indifferent electrode 79, to apply ablative current to heart tissue, e.g., RF current. Ablative circuits 78 include electrical isolation barriers as demanded by safety standards requirements. In some examples, leakage may occur for example at interface 67 between a power supply 72 of generator 71 and a first isolation ground 73 and/or at interface 69 between first isolation ground 73 and a second isolation ground 74.

Interface circuits 38, having EP sensing circuits 58, are connected via cable 232 to some of electrodes 48, and via cable 39 to body surface electrodes 49 to acquire EP signals from heart tissue. Sensing circuits 58 include electrical isolation barriers. Leakage may occur for example at interface 57 between a power supply 77 of sensing circuits 58 and a first isolation ground 76 and/or at interface 59 between first isolation ground 76 and a second isolation ground 85.

The shown example therefore has, in principle, four options for providing a low impedance line (LIL) that bypasses body of patient 28:

LIL (303): PATIENT RF GND #1 (73)-PATIENT EP GND #1 (76).

LIL (308): PATIENT RF GND #1 (73)-PATIENT EP GND #2 (85)

LIL (304): PATIENT RF GND #2 (74)-PATIENT EP GND #1 (76).

LIL (306): PATIENT RF GND #2 (74)-PATIENT EP GND #2 (85)

Different such connections may be required as an isolation barrier of each device has its own impedance and parasitic leakage current. As a result, each device causes its own parasitic potential on body that can be seen in ECG as interfering noise. Therefore, there may be a need to cancel possible potential gradients in patient body through low impedance line.

Finally, as seen, a safety capacitor 333 is typically included in apparatus 20 in the low impedance path (e.g., 303, 304, 306 and/or 308), where the capacitor 333 is required to protect the medical equipment. In addition to safety capacitor 333, an optional RF choke 334 may be added to prevent RF leakage.

The electrical circuit of FIG. 2 is brought by way of example, and is simplified for clarity. In practice additional or alternative subsystems may be coupled, and paths such as path 303 may be used.

Figure 3:
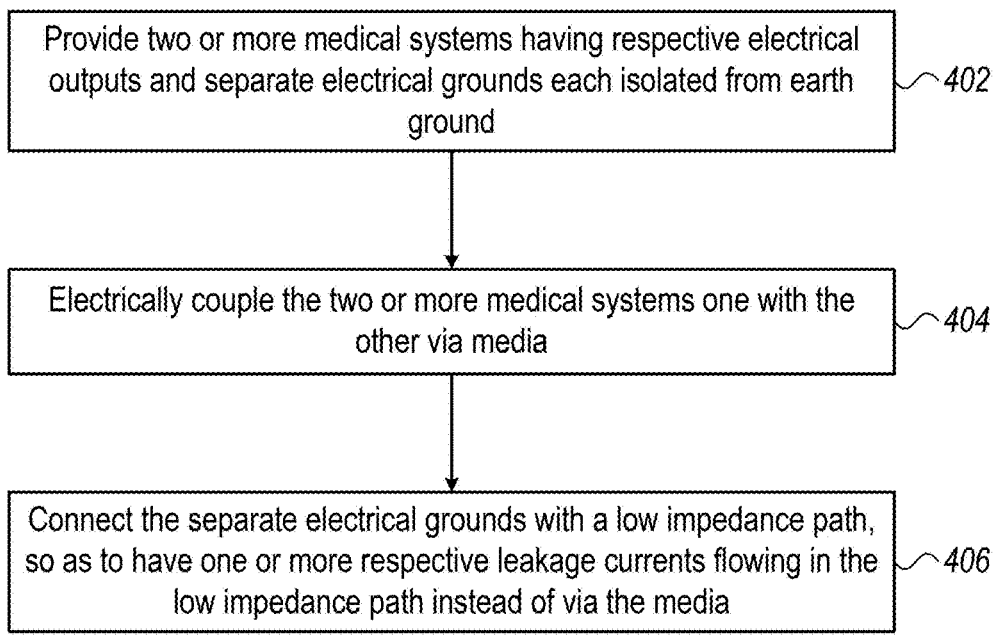
FIG. 3 is a flow chart that schematically illustrates a method for reducing power line noise in the system of FIG. 1, in accordance with an example of the present disclosure.

FIG. 3 is a flow chart that schematically illustrates a method for reducing power line noise in the system 20 of FIG. 1, in accordance with an example of the present disclosure. The process begins at a provisional step 402, in which two or more medical systems (e.g., an RF generator and EP acquisition circuitry) are provided, the systems having respective electrical outputs and separate electrical grounds, each isolated from power line and from an earth ground.

Next, at a coupling step 404, the two or more medical systems are electrically coupled, one with the other, via body of patient 28.

Finally, at grounds coupling step 404, a low-impedance path (e.g., path 303, 304, 306 and/or 308) is used for the leakage currents to avoid having the leakage current flow from one system to the other via body of patient 28.

The example configurations shown in the figures are chosen purely for the sake of conceptual clarity. In alternative examples, the disclosed techniques may use other suitable configurations comprising other wiring schemes, different standalone interfaces, and other types of catheters than a basket catheter.

Example 1: An apparatus comprises two or more medical systems (38, 71) having respective electrical outputs and respective separate isolation grounds each isolated from power lines and from earth ground, wherein the two or more medical systems are electrically coupled one with the other via a patient (28). A low impedance path (303, 304, 306 and/or 308) that connects the separate isolation grounds of the medical systems (38, 71) to one another, causing one or more leakage currents to flow via the low impedance path instead of via the patient (28).

Example 2: The apparatus according to example 1, wherein the low impedance path (303, 304, 306 and/or 308) comprises a capacitor (333) configured to block direct current (DC) from flowing in the path (202).

Example 3: The apparatus according to example 2, wherein the capacitor (333) is a Y2 capacitor.

Example 4: The apparatus according to any of examples 1 through 3, wherein the low impedance path (303, 304, 306 and/or 308) further comprises a radiofrequency (RF) choke (334) configured to block RF current from flowing in the path.

Example 4: The apparatus according to any of examples 1 through 3, wherein one of the two or more medical systems is an electrophysiological (EP) sensing system configured to acquire intra-cardiac electrocardiogram (IC-ECG) potentials between an electrode (48) of a catheter (21) in a body of a patient (28) and a Wilson Central Terminal (WCT) (61) arranged from surface electrodes (49) attached to the skin of the patient, wherein another of the two or more medical systems is an RF ablation system configured to apply an RF signal between an electrode (48) of the catheter (21) in the body of the patient (28) and an indifferent electrode (79) attached to the skin of the patient, and the low impedance electrical path (202) connects the WCT (61) with the indifferent electrode (79).

Example 5: A method includes providing two or more medical systems having respective electrical outputs and respective separate electrical grounds each isolated from power lines and from earth ground. The two or more medical systems are electrically coupled with one another via body of the patient. The separate electrical grounds of the medical systems are connected to one another via a low impedance path, thereby causing one or more leakage currents to flow via the low impedance path instead of via the patient.

It will be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
two or more medical systems having respective electrical outputs and respective separate isolation grounds each isolated from power lines and from earth ground, wherein the two or more medical systems are adapted to be electrically coupled one with the other via a body of a patient; and
a low impedance path that connects the separate isolation grounds of the medical systems to one another, wherein the low impedance path has an impedance that is lower than a predefined impedance associated with a human body and thereby causing one or more leakage currents to flow via the low impedance path instead of via the patient.

2. The apparatus according to claim 1, wherein the low impedance path is an electrical line and comprises a capacitor coupled along the electrical line, wherein the capacitor is configured to block direct current (DC) from flowing in the path.

3. The apparatus according to claim 2, wherein the capacitor is a Y2 capacitor.

4. The apparatus according to claim 3, wherein the low impedance path further comprises a radiofrequency (RF) choke coupled along the electrical line in series with the Y2 capacitor, wherein the RE choke is configured to block RF current from flowing in the path.

5. The apparatus according to claim 1, wherein:
one of the two or more medical systems is an electrophysiological (EP) sensing system configured to acquire intra-cardiac electrocardiogram (IC-ECG) potentials between an electrode of a catheter in a body of a patient and a Wilson Central Terminal (WCT) arranged from surface electrodes attached to the skin of the patient;
another of the two or more medical systems is an RF ablation system configured to apply an RF signal between an electrode of the catheter in the body of the patient and an indifferent electrode attached to the skin of the patient; and
wherein the low impedance electrical path connects the WCT with the indifferent electrode.

6. A method, comprising:
providing two or more medical systems having respective electrical outputs and respective separate isolation grounds each isolated from power lines and from earth ground;
electrically coupling the two or more medical systems with one another via a body of the patient; and
connecting the separate isolation grounds of the medical systems to one another via a low impedance path, wherein the low impedance path has an impedance that is lower than a predefined impedance associated with a human body and thereby causing one or more leakage currents to flow via the low impedance path instead of via the patient.

7. The method according to claim 6, wherein the low impedance path is an electrical line and comprises a Y2 capacitor coupled along the electrical line, wherein the Y2 capacitor is configured to block direct current (DC) from flowing in the path.

8. The method according to claim 7, wherein the low impedance path further comprises a radiofrequency (RF) choke coupled along the electrical line in series with the Y2 capacitor, wherein the RF choke is configured to block RF current from flowing in the path.

9. The method according to claim 6, wherein:
one of the two or more medical systems is an electrophysiological (EP) sensing system configured to acquire intra-cardiac electrocardiogram (IC-ECG) potentials between an electrode of a catheter in a body of a patient and a Wilson Central Terminal (WCT) arranged from surface electrodes attached to the skin of the patient;
another of the two or more medical systems is an RF ablation system configured to apply an RF signal between an electrode of the catheter in the body of the patient and an indifferent electrode attached to the skin of the patient; and
wherein the low impedance electrical path connects the WCT with the indifferent electrode.

* * * * *